(12) United States Patent
Kerestecioglu et al.

(10) Patent No.: US 10,300,428 B2
(45) Date of Patent: May 28, 2019

(54) METHOD AND DEVICE FOR SOUR GAS SCRUBBING

(71) Applicant: LINDE AKTIENGESELLSCHAFT, München (DE)

(72) Inventors: Ulvi Kerestecioglu, Geltendorf (DE); Alexander Brandl, Munich (DE)

(73) Assignee: Linde Aktiengesellschaft, Munich (DE)

( * ) Notice: Subject to any disclaimer, the term of this patent is extended or adjusted under 35 U.S.C. 154(b) by 436 days.

(21) Appl. No.: 14/911,329

(22) PCT Filed: Aug. 19, 2014

(86) PCT No.: PCT/EP2014/002277
§ 371 (c)(1),
(2) Date: Feb. 10, 2016

(87) PCT Pub. No.: WO2015/043707
PCT Pub. Date: Apr. 2, 2015

(65) Prior Publication Data
US 2016/0199773 A1    Jul. 14, 2016

(30) Foreign Application Priority Data
Sep. 24, 2013 (DE) .................. 10 2013 015 849

(51) Int. Cl.
*B01D 53/14* (2006.01)
*B01D 53/18* (2006.01)
(Continued)

(52) U.S. Cl.
CPC ..... *B01D 53/1406* (2013.01); *B01D 53/1425* (2013.01); *B01D 53/1462* (2013.01);
(Continued)

(58) Field of Classification Search
CPC ........ B01D 2252/2021; B01D 2256/16; B01D 2256/20; B01D 2257/308; B01D 53/1406;
(Continued)

(56) References Cited

U.S. PATENT DOCUMENTS

| | | | | |
|---|---|---|---|---|
| 3,737,392 A | * | 6/1973 | Ameen et al. ..... | B01D 53/1468 106/311 |
| 3,910,777 A | | 10/1975 | Jakob | |
| 4,824,452 A | | 4/1989 | Grunewald et al. | |

FOREIGN PATENT DOCUMENTS

DE  102007051181 A1  4/2009

\* cited by examiner

*Primary Examiner* — Cabrena Holecek
(74) *Attorney, Agent, or Firm* — Philip H. Von Neida

(57) ABSTRACT

A method and device for gas scrubbing, in which, in a first scrubbing step, substances of a first kind and, in a subsequent second scrubbing step, substances of a second kind are selectively washed out from the gas mixture that is made to flow in countercurrent to physically acting scrubbing agents, wherein part of the scrubbing agent that is free from substances of the first kind but laden with substances of the second kind in the second scrubbing step is used in the first scrubbing step, and so there occurs a scrubbing agent stream that is laden with substances of the first and second kinds, during the regeneration of which a partly regenerated scrubbing agent stream (semilean); that contains substances of the first and second kinds but has a lower content of substances of the first kind than the scrubbing agent stream laden in the first scrubbing step is generated.

8 Claims, 1 Drawing Sheet

(51) Int. Cl.
  *C01B 3/52* (2006.01)
  *C10K 1/08* (2006.01)
(52) U.S. Cl.
  CPC ............... *B01D 53/18* (2013.01); *C01B 3/52* (2013.01); *C10K 1/08* (2013.01); *B01D 2252/2021* (2013.01); *B01D 2256/16* (2013.01); *B01D 2256/20* (2013.01); *B01D 2257/308* (2013.01); *Y02P 20/152* (2015.11)
(58) Field of Classification Search
  CPC ............ B01D 53/1425; B01D 53/1462; B01D 53/18; C01B 3/52; C10K 1/08; Y02P 20/152
  See application file for complete search history.

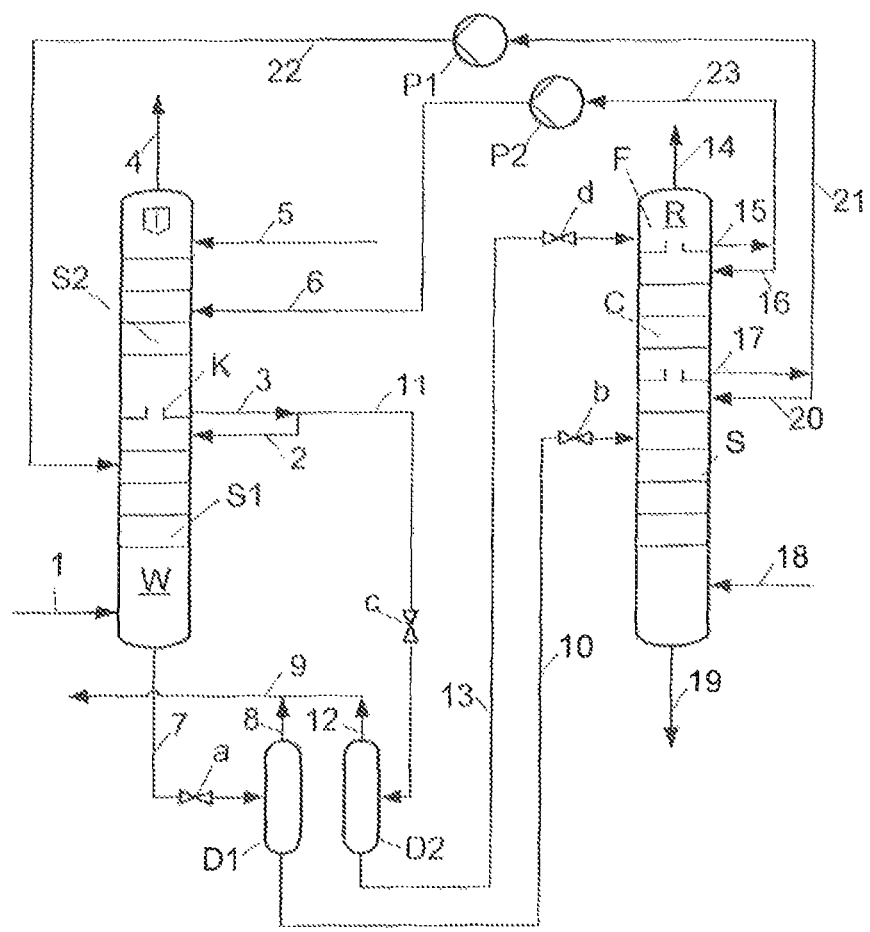

METHOD AND DEVICE FOR SOUR GAS SCRUBBING

CROSS-REFERENCE TO RELATED APPLICATIONS

This application claims priority under 35 USC § 119 to International Patent Application No. PCT/EP2014/02277, filed on Aug. 19, 2014, which claims priority from German Patent Application DE 10 2013 015849.4, filed on Sep. 24, 2013.

BACKGROUND OF THE INVENTION

The invention relates to a gas scrubbing process in which materials of a first type are selectively scrubbed out of a gas mixture conveyed in countercurrent to a physically acting scrubbing medium in a first scrubbing step and materials of a second type are selectively scrubbed out in a subsequent second scrubbing step, where a part of the scrubbing medium which has been loaded with materials of the second type in the second scrubbing step and is free of materials of the first type is used in the first scrubbing step so as to form a scrubbing medium stream which is loaded with materials of the first type and of the second type, in the regeneration of which a partially regenerated scrubbing medium stream (semilean) which contains materials of the first type and of the second type and has a lower content of materials of the first type than the scrubbing medium stream which has been loaded in the first scrubbing step is produced.

In addition, the invention relates to an apparatus for carrying out the process of the invention.

Physical gas scrubs utilize the ability of liquids to absorb gaseous materials and keep them in solution without chemically binding the gases. How well a gas is absorbed by a liquid is expressed by the solubility coefficient: the better the gas dissolves in the liquid, the greater is its solubility coefficient. The solubility coefficient is temperature-dependent and generally increases with decreasing temperature.

If a gas component i is to be dissolved out of a gas mixture, by physical scrubbing, it is for this purpose necessary to use a minimum amount $W_{min}$ of the liquid employed as scrubbing medium, which can be calculated very readily by means of the following formula:

$$W_{min} = V/(p \cdot \lambda_i)$$

In the formula, V is the total amount of the gas mixture, p is the pressure prevailing in the gas mixture and λ is the solubility coefficient of the gas component to be scrubbed out in respect of the scrubbing medium used.

With the proviso that the solubility coefficients of the components of a gas mixture differ sufficiently greatly, it is possible to separate off, i.e, selectively remove, the gas component having the greatest solubility coefficient largely independently of the other gas components in a scrubbing step by appropriate adaption of the amount of scrubbing medium. Following the same principle, further gas components or groups of gas components having similar solubility coefficients can be selectively scrubbed out using larger amounts of scrubbing medium in subsequent scrubbing steps.

The gas components which have been scrubbed out are removed from the loaded scrubbing medium after the gas scrub, by which means the scrubbing medium is regenerated. The regenerated scrubbing medium is normally reused in the gas scrub, while the gas components which have been scrubbed out are either disposed of or passed to a profitable use.

For the purification of crude synthesis gases which are produced on an industrial scale from coal and/or hydrocarbon feeds in gasification plants, for example by reforming using steam or by partial oxidation, and generally contain some undesirable constituents such as wafer, carbon dioxide ($CO_2$), hydrogen sulfide ($H_2S$) and carbon oxide sulfide (COS), preference is given to using physical gas scrubs. These processes are attractive since the crude synthesis gases are nowadays usually produced under high pressure and the effectiveness of physical gas scrubs to a first approximation increases linearly with the operating pressure. The methanol scrub is of particular importance for the purification of crude synthesis gases. It utilizes the fact that the solubility coefficients of $H_2S$, COS and $CO_2$ in liquid, low-temperature methanol differ by several orders of magnitude from those of hydrogen ($H_2$) and carbon monoxide (CO). The fact that the sulfur components have very similar solubility coefficients which are significantly greater than the solubility coefficient of $CO_2$ in liquid, low-temperature methanol is exploited in order to separate off the two types of material selectively from crude synthesis gas and possibly utilize them profitably.

According to the prior art, the crude synthesis gas is subjected to a gas scrub which consists of two scrubbing steps and in which liquid methanol is used as physically acting scrubbing medium in order to separate off sulfur components and carbon dioxide selectively. In the first scrubbing step, in which the sulfur components are separated off from the crude synthesis gas, part of the methanol which has been loaded with $CO_2$ in the second scrubbing step but is free of sulfur is used as scrubbing medium. The methanol which has been loaded with sulfur components and $CO_2$ in the first scrubbing step is subsequently completely regenerated, with the dissolved materials being separated off with a considerable outlay in order to produce methanol of scrubbing medium purity. The methanol of scrubbing medium purity is subsequently recirculated and reused as scrubbing medium in the second scrubbing step in order to separate $CO_2$ from the crude synthesis gas.

SUMMARY OF THE INVENTION

It is an object of the present invention to provide a process of the type mentioned at the outset and also an apparatus for carrying out the process which allow the gas scrub to be carried out with a smaller outlay and thus more economically than has been possible according to the prior art.

This object is achieved by at least a part of the semilean being recirculated directly to the first scrubbing step and used as scrubbing medium there.

For the present purposes, direct recirculation means that the chemical composition of the recirculated part of the semilean is not altered by removal of materials up to its use in the first scrubbing step. The addition of materials, for example scrubbing medium which has not been loaded or partially loaded scrubbing medium, and changes in the pressure and/or the temperature, on the other hand, are not intended to be ruled out.

The amount of scrubbing medium to be completely regenerated is significantly reduced compared to the prior art by the process or the invention, as a result of which savings in both capital costs and operating costs are obtained.

Many methods of producing the semilean are conceivable. For example, materials of the first type can be separated off by flashing and/or stripping from the scrubbing medium which has been loaded in the first scrubbing step, preferably using nitrogen as stripping gas. However, other gases which are insoluble or only sparingly soluble in methanol can also be utilized for this purpose.

In a process of the type in question, the scrubbing medium which has been loaded with materials of the first type and of the second type in the first scrubbing step is usually depressurized via an inlet and introduced into the middle region of an enrichment column in which materials of the second type are driven off by means of a stripping gas and the concentration of the materials of the first type is thereby increased. In order to minimize the losses of materials of the first type, the column is configured as scrubbing column in its upper region where the materials of the first type are backscrubbed from the loaded stripping gas. Backscrubbing is effected using scrubbing medium which is free of materials of the first type but can be loaded with materials of the second type. The concentration of materials of the first type in the scrubbing medium stream therefore increases continuously from the top downward as the scrubbing medium stream passes through the column, and is, in particular, lower in the region configured as scrubbing column than in the scrubbing medium, which has been loaded in the first scrubbing step. In order to obtain semilean, it is proposed that scrubbing medium which is loaded with materials of the first type which have been backscrubbed from the stripping gas be taken off from the region of the column configured as scrubbing column via a side offtake arranged above the inlet for the scrubbing medium loaded with materials of the first type and of the second type.

Under otherwise the same conditions, the concentration of the materials of the first type in the semilean is determined by the vertical distance between side offtake and inlet: the smaller the distance, the higher the concentration. Thus, varying this distance makes it possible to match the composition of the semilean to the requirements of the first scrubbing step. Furthermore, it is possible to arrange a plurality of side offtakes at different heights on the stripping column and obtain a plurality of semilean streams having different compositions. Preference is given to using at least parts of the various semilean streams as scrubbing medium in different sections of the first scrubbing step.

The scrubbing medium used for backscrubbing is advantageously obtained from the part of the scrubbing medium which has been loaded with materials of the second type in the second scrubbing step and is free of materials of the first type and which is not used as scrubbing medium in the first scrubbing step. For this purpose, materials of the second type are preferably separated off by flashing so as to produce a further partially regenerated scrubbing medium stream (semilean1) which can subsequently be used for backscrubbing the materials of the first type from the loaded stripping gas.

In one patent application DE102007051181, which is likewise concerned with the selective separation of materials of a first type and of a second type from a crude gas by scrubbing with a physically acting scrubbing medium and the contents of which are incorporated in their entirety by reference into the present description, it is proposed that only part of the semilean1 be used for backscrubbing of the materials of the first type from the loaded stripping gas and the remaining part (semilean2) be used directly without further regeneration as scrubbing medium for separating off materials of the second type in the second scrubbing step. This likewise gives economic advantages and for this reason an advantageous embodiment of the process of the invention provides a combination with the process described in DE102007051181.

The invention is not restricted to a specific type of gas scrub. However, a preferred variant of the process according to the invention provides for the gas scrub to be a methanol scrub in which sulfur components (materials of the first type) and carbon dioxide (materials of the second type) are selectively separated off from a crude synthesis gas comprising hydrogen and carbon monoxide by means of liquid methanol.

Furthermore, the invention provides a gas scrubbing apparatus comprising a scrubbing device which has at least one first scrubbing section and connected in series to this a second scrubbing section and through which a physically acting scrubbing medium can be conveyed in countercurrent to a gas mixture, where materials of a first type and of a second type can be separated off from the gas mixture so as to produce a scrubbing medium stream loaded with materials of the second type and a scrubbing medium stream loaded with materials of the first type and of the second type, and also a regeneration device which is connected to the first scrubbing section and serves the purpose of at least partially regenerating a scrubbing medium which is loaded with materials of the first type and of the second type and can be brought from the first scrubbing section so as to give a partially regenerated scrubbing medium stream (semilean) which contains materials of the first type and of the second type and has a lower content of materials of the first type than the loaded scrubbing medium stream brought from the first scrubbing section.

According to the invention, the stated object is achieved in terms of an apparatus by the regeneration device being connected to the first scrubbing section in such a way that at least part of the semilean can be fed directly as scrubbing medium to the first scrubbing section.

The regeneration device can, for example, be configured as a flash vessel and/or as a stripping column, so that materials of the first type can be separated off from the loaded scrubbing medium brought from the first scrubbing section by flashing and/or stripping with a stripping gas so as to form semilean.

However, the regeneration device is preferably configured as an enrichment column which in its upper region is configured as a scrubbing column and in its lower region as a stripping column and in its middle region has an inlet via which the loaded scrubbing medium brought from the first scrubbing section can be depressurized and introduced into the stripping column. The enrichment column can be operated in such a way that, in the stripping column, materials of the second type can be separated off by means of a stripping gas from the loaded scrubbing medium introduced which can subsequently be passed on to the scrubbing column in order to backscrub materials of the first type which have likewise been separated off by means of a scrubbing medium which is largely free of materials of the first type and thus produce semilean.

A preferred variant of the apparatus of the invention provides at least one side offtake which is arranged above the inlet in the region of the scrubbing column and via which semilean can be taken off from the scrubbing column and fed as scrubbing medium to the first scrubbing section. If a plurality of side offtakes are provided, these are preferably arranged at different vertical distances from the inlet, so that semilean having different concentrations of materials of the first type can be taken off. In this case, the first scrubbing section is advantageously connected to the scrubbing column in such a way that the various semilean streams can each be introduced at different points into the first scrubbing section.

Furthermore, it is proposed that the enrichment column be connected to a flash vessel into which scrubbing medium which comes from the second scrubbing section and is loaded only with materials of the second type can be depressurized, so that at least a part of the depressurized scrubbing medium can be fed as scrubbing medium to the scrubbing column for backscrubbing materials of the first type from loaded stripping gas. The flash vessel is advantageously arranged above the scrubbing column and with this forms a single structural unit. The flash vessel is preferably connected to the second scrubbing section in such a way that at least one other part of the depressurized scrubbing medium can be fed as scrubbing medium to the second scrubbing section.

BRIEF DESCRIPTION OF THE DRAWINGS

A particularly preferred embodiment of the apparatus or the invention provides for the gas scrub to be a methanol scrub in which sulfur components (materials of the first type) and carbon dioxide (materials of the second type) can be selectively separated off from a crude gas comprising hydrogen and carbon monoxide by means of liquid methanol.

DETAILED DESCRIPTION OF THE INVENTION

The invention is illustrated below with the aid of a working example shown schematically in FIG. 1.

FIG. 1 shows a section of a methanol scrub in which sulfur components and carbon dioxide are selectively separated off from a crude synthesis gas consisting predominantly of hydrogen and carbon monoxide by scrubbing with low-temperature, liquid methanol.

The crude synthesis gas to be purified is introduced via line 1 into the scrubbing device W in which the two scrubbing sections S1 and S2 are arranged above one another and are separated from one another by the chimney tray K. The crude synthesis gas flows upward into the first scrubbing section S1 where it is brought into intimate contact with scrubbing medium flowing downward from above and is freed of sulfur components. The scrubbing medium which is introduced at the upper end of the scrubbing section S1 via line 2 in an amount matched to the solubility coefficient of the sulfur component is a part of the methanol scrubbing medium which is loaded with carbon dioxide but free of sulfur components and is taken off from the chimney tray K via line 3.

The crude synthesis gas which has been freed of sulfur components flows via the chimney tray K into the second scrubbing section S2 in which it is conveyed upward and on the way is scrubbed by scrubbing medium conveyed in countercurrent and freed of carbon dioxide. The purified synthesis gas is taken off from the scrubbing column W via line 4 and passed to a use (not shown). Methanol which is not loaded is fed as scrubbing medium to the upper end of the second scrubbing section S2 via line 5.

A methanol loaded with sulfur components and carbon dioxide is taken off from the scrubbing device W via line 7, if depressurized by means of the throttle device a, fed into the separator D1 and separated into a gas phase and a liquid phase there. The gas phase, which consists mainly of scrubbed-out hydrogen and carbon monoxide, is taken off from the separator D1 via line 8 and is recirculated via line 9 to a point upstream of the methanol scrub. The liquid phase is taken off via line 10, depressurized further through the inlet b and introduced into the lower part of the enrichment column R, which lower part is configured as the stripping column S and is supplied with nitrogen as stripping gas via line 18.

On its way upward, the stripping gas dissolves predominantly carbon dioxide but also sulfur components out of the downward-flowing liquid phase, so that stripping gas loaded with carbon dioxide and sulfur components goes into the upper part C, which is configured as scrubbing column, of the enrichment column R. To minimize the discharge of sulfur into the environment, the loaded stripping gas is subjected here to a gas scrub in which methanol 16 which is preloaded with carbon dioxide but is free of sulfur is used as scrubbing medium which on its way downward becomes continuously enriched with backscrubbed sulfur components. Methanol (semilean) 17 is enriched with sulfur components can therefore be taken off from the scrubbing column C via a side offtake, where the sulfur content of the semilean is lower than the sulfur content of the scrubbing medium 7 which has been loaded in the first scrubbing section S1. A part 20 of the semilean is conveyed further into the stripping column S for further backscrubbing of sulfur components, while another part 21 is conveyed as scrubbing medium 22 by means of the pump P1 into the first scrubbing section S1.

To obtain the scrubbing medium 16 used in the scrubbing column C, the second part of the methanol stream 3, which is loaded, with carbon dioxide but free of sulfur components, which is not required as scrubbing medium in the first scrubbing section S1 is passed on via line 11 and depressurized via the throttle device c into the separator D2. The gas phase formed on depressurization, which consists predominantly of hydrogen and carbon monoxide, is taken off from the separator via line 12 and, just like the gas phase 8, passed on via line 9. The liquid phase is taken off from the separator D2 via line 13, depressurized further through the inlet d and fed into the uppermost part of the column R, which is configured as a flash vessel F. During depressurization, part of the carbon dioxide dissolved in the liquid phase 13 is liberated and is subsequently discharged together with loaded stripping gas as tailgas 14 from the methanol scrub and released into the environment. Partially regenerated methanol is taken off from the flash vessel F via line 15 and divided into two partially regenerated methanol streams of which one is introduced as scrubbing medium 16 into the scrubbing column C while the other stream 23 is conveyed as scrubbing medium 6 by means of the pump P2 into the second scrubbing section S2.

Methanol 19 which has a significantly reduced carbon dioxide content and increased content of sulfur components is taken off from the bottom of the enrichment column R and passed to further regeneration (not shown).

What we claim is:

1. A gas scrubbing process comprising selectively scrubbing materials of a first type out of a gas mixture conveyed in a countercurrent manner to a scrubbing medium in a first scrubbing step and selectively scrubbing out materials of a second type in a second scrubbing step, wherein the process comprises the steps: scrubbing a part of the scrubbing medium which is loaded with materials of the second type and is free of materials of the first type thereby forming a scrubbing medium stream which contains materials of the first type and materials of the second type which is regenerated to form, a partially regenerated semilean scrubbing medium stream which contains materials of the first type and materials of the second type and has a lower content of materials of the first type than the scrubbing medium stream of the first scrubbing step, separating materials of the second type from the scrubbing medium which has been loaded in the first scrubbing step by stripping and subjecting the stripping gas which has been loaded with materials of the first type and materials of the second type to a gas scrub using a scrubbing medium which is free of materials of the first type to form the semilean scrubbing medium comprising recirculating directly to the first scrubbing step at least a part of the semilean scrubbing medium and using as a scrubbing medium in the first scrubbing step.

2. The process as claimed in claim 1, comprising separating a plurality of semilean scrubbing medium streams having different concentrations of materials of the first type from the gas scrub, and using the plurality of semilean scrubbing medium streams as scrubbing medium in different sections of the first scrubbing step.

3. The process as claimed in claim 1, comprising obtaining the scrubbing medium used for backscrubbing from a part of the scrubbing medium which has been loaded with materials of the second type in the second scrubbing step and is free of materials of the first type and which is not used as scrubbing medium in the first scrubbing step.

4. The process as claimed in claim 1, wherein the gas scrub is a methanol scrub formed by selectively separating off sulfur components and carbon dioxide from a crude synthesis gas comprising hydrogen and carbon.

5. A gas scrubbing apparatus comprising a scrubbing device which has at least one first scrubbing section connected in series to a second scrubbing section through which a scrubbing medium can be conveyed countercurrent to a gas mixture, where materials of a first type and of a second type can be separated off from the gas mixture so as to produce a scrubbing medium stream loaded with materials of the second type and a scrubbing medium stream loaded with materials of the first type and of the second type, a regeneration device which is connected to the first scrubbing section to partially regenerate a scrubbing medium loaded with materials of the first type and of the second type from the first scrubbing section to produce a partially regenerated semilean scrubbing medium stream which contains materials of the first type and of the second type and has a lower content of materials of the first type than the loaded scrubbing medium stream brought from the first scrubbing section, comprising the regeneration device is connected to the first scrubbing section so that at least a part of the semilean scrubbing medium can be fed directly to the first scrubbing section, wherein the regeneration device is configured as an enrichment column which in its upper region is a scrubbing column and in its lower region is a stripping column and in its middle region has an inlet via which the loaded scrubbing medium brought from the first scrubbing section can be depressurized and introduced into the stripping column.

6. The apparatus as claimed in claim 5, wherein at least one side offtake in which semilean scrubbing medium can be taken off from the scrubbing column is arranged above the inlet.

7. The apparatus as claimed in claim 5, wherein a plurality of side offtakes are arranged at different vertical distances from the inlet so that semilean scrubbing medium having different concentrations of materials of the first type can be taken off from the scrubbing column.

8. The apparatus as claimed in claim 5, wherein the enrichment column is connected to a flash vessel into which scrubbing medium which comes from the second scrubbing section and is loaded only with materials of the second type can be depressurized, wherein at least a part of the depressurized scrubbing medium can be fed to the scrubbing column for backscrubbing materials of the first type from a loaded stripping gas.

\* \* \* \* \*